United States Patent

Swaminathan et al.

(10) Patent No.: US 9,794,866 B2
(45) Date of Patent: Oct. 17, 2017

(54) MOBILE DEVICE WITH IMPROVED NETWORK SCANNING

(71) Applicant: Apple Inc., Cupertino, CA (US)

(72) Inventors: Arvind Swaminathan, San Jose, CA (US); Umesh K. Shukla, Sunnyvale, CA (US); Srinivas Pasupuleti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 14/689,018

(22) Filed: Apr. 16, 2015

(65) Prior Publication Data

US 2016/0309399 A1 Oct. 20, 2016

(51) Int. Cl.
| | |
|---|---|
| *H04B 1/18* | (2006.01) |
| *H04W 4/00* | (2009.01) |
| *H04W 48/16* | (2009.01) |
| *H04W 52/02* | (2009.01) |
| *H04W 88/06* | (2009.01) |

(52) U.S. Cl.
CPC ....... *H04W 48/16* (2013.01); *H04W 52/0216* (2013.01); *H04W 88/06* (2013.01); *Y02B 60/50* (2013.01)

(58) Field of Classification Search
CPC ............ H04W 36/0061; H04W 24/00; H04W 48/16; H04W 36/08; H04W 52/0251; H04W 84/02
USPC ........... 455/161.1, 434, 435.2; 370/252, 311, 370/328, 329
See application file for complete search history.

(56) References Cited

U.S. PATENT DOCUMENTS

| | | | | |
|---|---|---|---|---|
| 5,197,093 | A * | 3/1993 | Knuth ............... | H04M 1/72511 455/161.1 |
| 6,173,181 | B1 * | 1/2001 | Losh ................. | H04W 36/0061 370/329 |
| 2004/0090929 | A1 * | 5/2004 | Laux .................... | H04W 24/00 370/311 |
| 2004/0224689 | A1 | 11/2004 | Raghuram et al. | |
| 2006/0009216 | A1 * | 1/2006 | Welnick ............... | H04W 48/16 455/434 |
| 2008/0075035 | A1 * | 3/2008 | Eichenberger ....... | H04W 36/08 370/328 |

(Continued)

FOREIGN PATENT DOCUMENTS

EP 2214441 B1 5/2012

*Primary Examiner* — William D Cumming
(74) *Attorney, Agent, or Firm* — Meyertons Hood Kivlin Kowert & Goetzel, P.C.; Jeffrey C. Hood; Brian E. Moore

(57) ABSTRACT

Apparatuses, systems, and methods for user equipment (UE) devices to more efficiently scan frequency bands for potential base stations may include a UE configured to store information regarding results of prior cellular scan operations for a cell and to perform a new cellular scan operation while camped in the first cell. The new cellular scan operation may be partially based on the stored information. The prior cellular scan operations may have been performed to identify frequencies of available cellular base stations. The UE may update the information regarding results of prior cellular scan operations with information regarding success or failure of the new cellular scan operation. The UE may maintain lists of cells for which a cellular scan has been successful or unsuccessful and adjust the new cellular scan operation based at least partially on contents of at least one of these lists.

25 Claims, 7 Drawing Sheets

(56) References Cited

U.S. PATENT DOCUMENTS

| | | | |
|---|---|---|---|
| 2010/0113018 A1* | 5/2010 | Furumi | H04W 48/16 |
| | | | 455/435.2 |
| 2012/0190361 A1 | 7/2012 | Shaikh et al. | |
| 2015/0126187 A1 | 5/2015 | Ponukumati et al. | |
| 2015/0131461 A1* | 5/2015 | Ramkumar | H04W 52/0251 |
| | | | 370/252 |
| 2016/0309399 A1* | 10/2016 | Swaminathan | H04W 48/16 |
| 2016/0309400 A1* | 10/2016 | Swaminathan | H04W 84/02 |

* cited by examiner

| Cell-Info | Scan Type | Num Success | Last Success | Num Failure | Last Failure | Successful RAT/Freq |
|---|---|---|---|---|---|---|
| CGI of Cell | 1 or 2 or 3 (1=HP-PLMN, 2=BRR, 3=Resel) | 0 | 0 | 4 | T1 | 0 |
| C2 | 1 | 1 | T2 | 3 | T3 | F3-W |
| C3 | 2 | 1 | T4 | 2 | T6 | F3-LTE |

*FIG. 8*

| (EU)ARFCN | Failure Type | Failure Occurrence Time |
|---|---|---|
| 1350 | 1(S_criterion fail) | 1 |
| 10562 | 2(SIB decode failure) | 3 |
| 5010 | 5(spurios fine frequency energy) | 4 |

*FIG. 9*

| Failure Type | Handling of Freq in SLS | Handling of Freq in DBS |
|---|---|---|
| 1(S_criterion fail) | Stationary: Avoid freq 2 out of 3 scans  Motion: Avoid freq in 1 out of 3 scans | Block frequency if it is part of SLS list |
| 2(SIB decode) | Stationary: Avoid freq 1 out of 3 scans  Motion: Avoid SIB decode in 1 out of 3 scans if RSSI<=Failure RSSI | Block frequency if it is part of SLS list |
| 3(Forbidden PLMN) | Avoid for next N_forbid scans unless there is enough motion | Block frequency for N_forbid_DBS unless there is enough motion |
| 4(RACH Failure) | Existing avoidance logic from RACH optimization | |
| 5(spurios fine frequency energy) | None | Larger fine frequency threshold for the freq unless there is enough motion |

MOBILE DEVICE WITH IMPROVED NETWORK SCANNING

FIELD

The present application relates to wireless devices, and more particularly to an apparatus, system, and method for wireless devices to perform a multi-RAT band scan.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may use a search algorithm to acquire service with a wireless network. These search algorithms may burden device resources. Thus, improvements in the field are desired.

SUMMARY

Embodiments are presented herein of methods for wireless devices to more efficiently scan frequency bands for potential base stations and of devices configured to implement these methods. Embodiments relate to a user equipment (UE) device having at least one antenna for performing wireless communications, a radio, and a processing element coupled to the radio. The UE may perform voice and/or data communications, as well as the methods described herein.

According to the techniques described herein, the UE may store information regarding results of prior cellular scan operations for a first cell, wherein the prior cellular scan operations identify frequencies of available cellular base stations. Additionally, while camped in the first cell the UE may perform a new cellular scan operation based at least in part on the information regarding results of prior cellular scan operations.

In some embodiments, a non-transitory memory medium may include program instructions executable by a UE that, when executed, cause the UE to receive an indication to perform a cellular scan while camped in a first cell and to access first information regarding results of prior cellular scan operations for the first cell. Additionally, the instructions, when executed, may cause the UE to determine a set of cellular frequencies for the cellular scan based at least in part on the first information and to perform the cellular scan using the determined set of cellular frequencies.

In some embodiments, a method performed by the UE may include the UE receiving an indication that a cellular scan is to be performed while the UE is camped in a first cell and the UE analyzing a data structure to determine if the data structure comprises first information regarding results of prior cellular scan operations for the first cell. While camped in the first cell, the UE may perform a new cellular scan operation based at least in part on the first information regarding results of prior cellular scan operations for the first cell.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 illustrates one example of a cellular scan result data structure according to some embodiments;

FIG. 9 illustrates one example of an OOS fail table (data structure) according to some embodiments; and FIG. 10 illustrates one example of a list of rules to handle problematic frequencies according to information regarding prior scans of those frequencies as stored in the OOS fail table, according to some embodiments.

Figure 1:
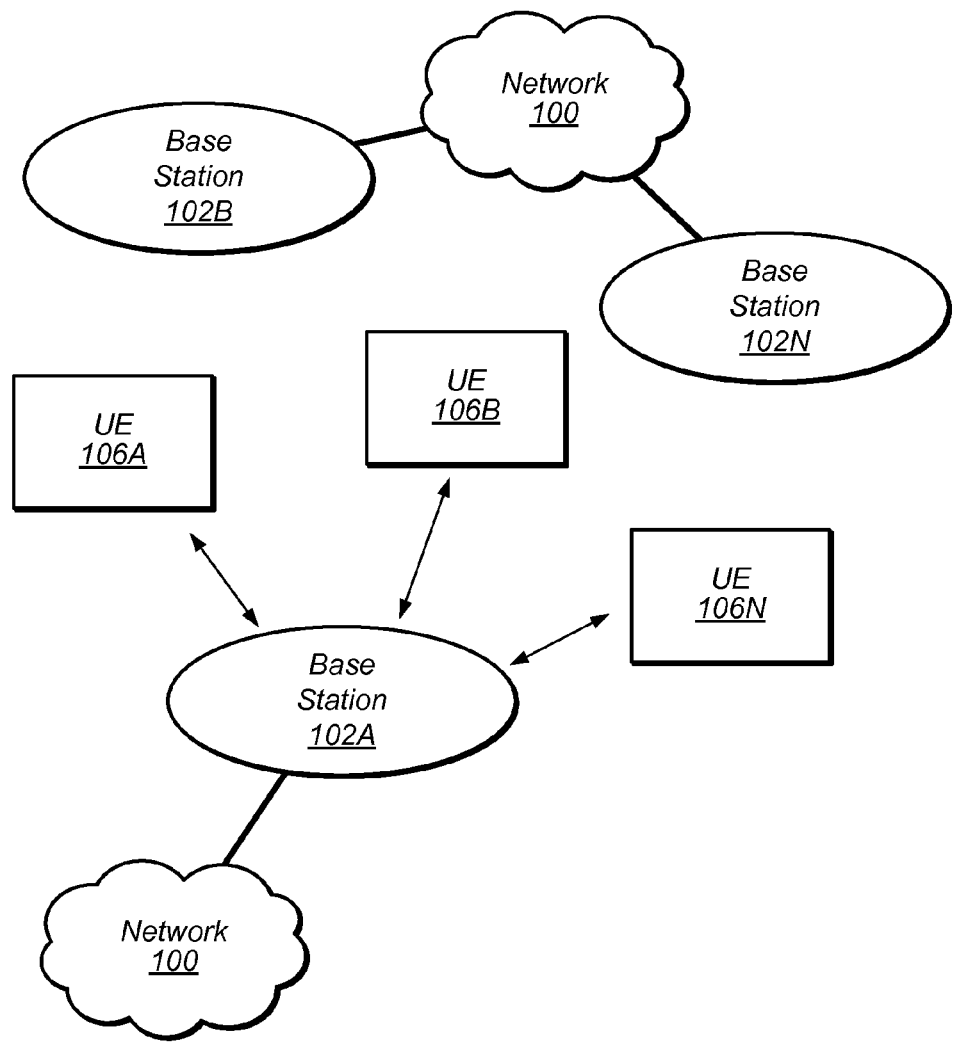
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
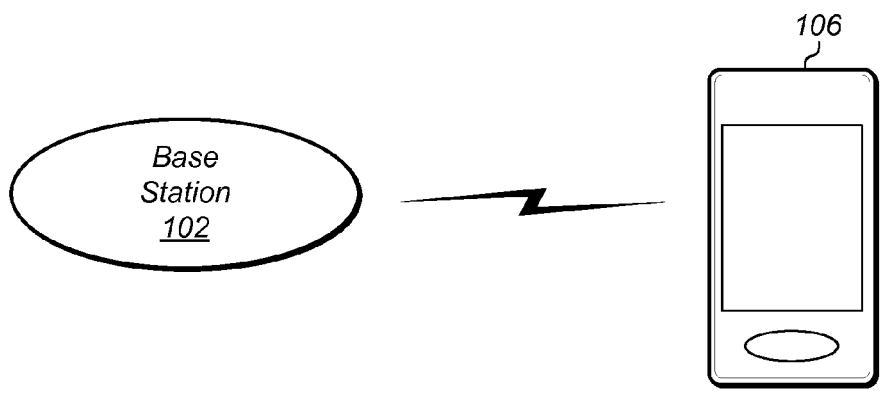
FIG. 2 illustrates a base station (BS) in communication with a user equipment (UE) device according to some embodiments.

FIGS. 1 and 2—Communication System

FIG. 1 illustrates a simplified example wireless communication system, according to one embodiment. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to one embodiment. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
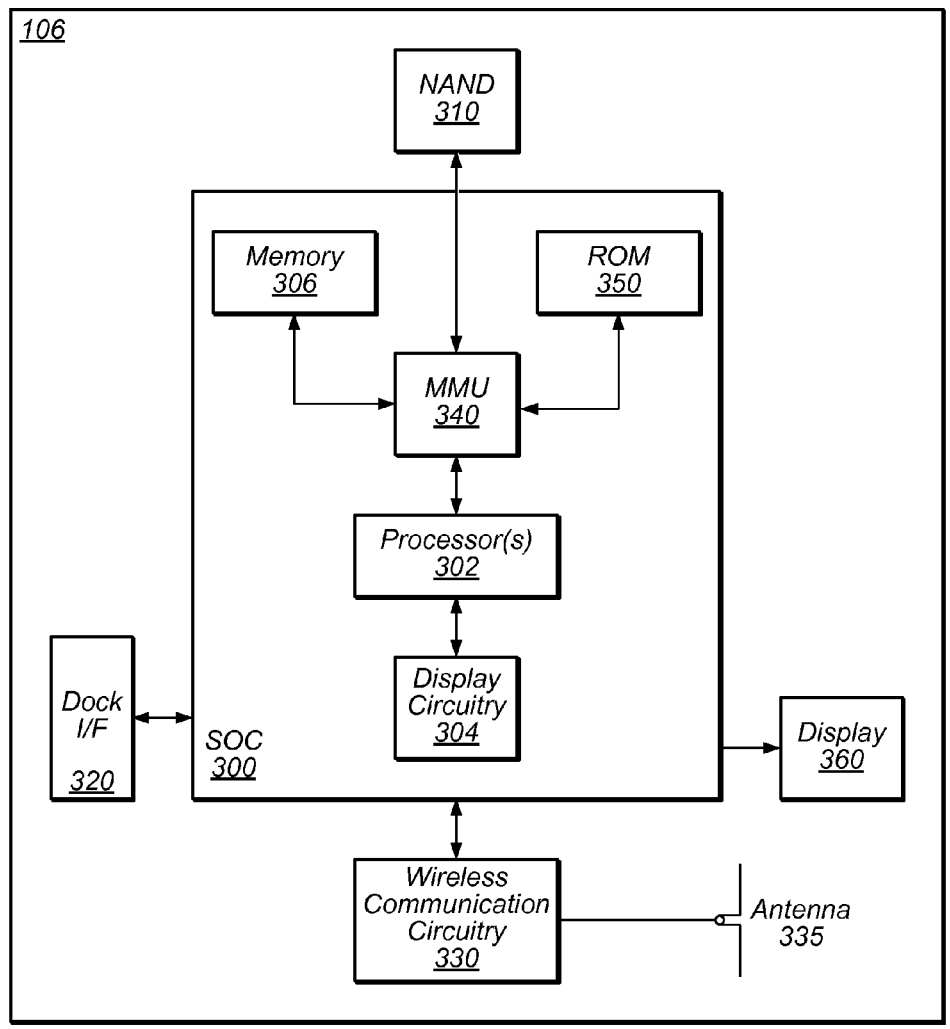
FIG. 3 illustrates an example block diagram of a UE according to some embodiments.

FIG. 3—Block Diagram of a UE

FIG. 3 illustrates an example block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 106 may include hardware and software components for implementing features for performing more efficient cellular base station scanning, such as those described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein.

Figure 4:
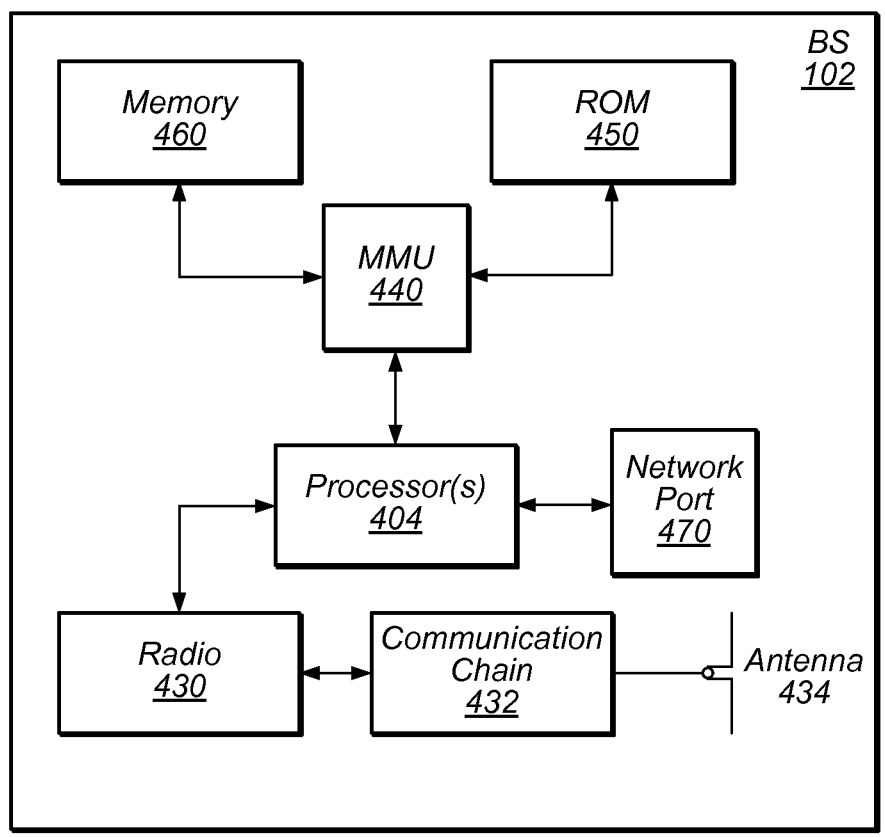
FIG. 4 illustrates an example block diagram of a BS according to some embodiments.

FIG. 4—Block Diagram of a Base Station

FIG. 4 illustrates an example block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multimode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Background—HP-PLMN Scans

In some existing implementations, a UE that is currently camped on a visiting public land mobile network (VPLMN) performs a scan for a higher priority public land mobile network (HP-PLMN) if there is a more preferred system in the same country than the VPLMN on which it is camped. This operation is described in, for example, 3GPP TS 23.122. This technical specification requires the UE to perform the HP-PLMN scans with a periodicity specified in the UE's SIM card. These HP-PLMN scans may be referred to as domestic HP-PLMN scans.

However, many cellular operators have proprietary requirements where they desire the following:

1) the UE should group two or more countries together into a group, referred to as an MCC-group (Mobile Country Code group).

2) the UE should perform an HP-PLMN scan if there is a system in the MCC-group that is more preferred than the VPLMN on which the UE is currently camped;

This requirement is designed to avoid excessive roaming charges in the following scenario:

1) the UE is near a country border and accidentally roams on to a system in another country due to temporary issues on the home system.

2) without the proprietary HP-PLMN scans, it will take a long time (the UE will have to be out of service (OOS) on the roaming system) for the UE to get back to the higher priority network.

For a practical example, assume a cellular carrier such as AT&T has established an MCC group composed of the US and Canada. Even if a UE that subscribes to the AT&T network is camped on the most preferred Canadian system, the cellular carrier (AT&T) will still want the UE to perform HP-PLMN scans. This is due to the fact that there is a more preferred system (AT&T) in the MCC group, even though there is not a more preferred system in the same country as the VPLMN. These proprietary HP-PLMN scans may be referred to as Non-MCC HP-PLMN scans.

However, a problem arises due to the fact that these Non-MCC HP-PLMN scans are not governed by any current standards. Hence, there is no requirement for the UE to perform these Non-MCC HP-PLMN scans at the rate defined by the SIM card.

In order to save power, the non-MCC HP-PLMN scans may only be performed when UE is in range of the cross border preferred PLMN. Currently, the baseband (BB) processor in a UE relies on a location services component in an application processor (AP) to determine if it is in a border area.

Thus the current approach has some drawbacks. First, there are field scenarios where location services are not able to classify current location as border or non-border with sufficient certainty. Also, the method fails if location services are turned OFF. Further, the AP needs to be woken up to re-obtain the border indication when the UE moves or the AP cannot provide the border indication the first time which causes increased power consumption.

Still further, the granularity of the border information provided by the AP may not be at the cell-ID level (as a result the border scans are performed over a wider area than needed). In addition to the above, there is an opportunity to improve the power consumption in the "non-proprietary" HP-PLMN or Better-system reselection (BSR) scans by restricting longer scans to locations that have high probability of success.

In some embodiments, the UE includes automated learning logic which records and utilizes the success and/or failure of past non-MCC HP-PLMN scans on a given cell to determine the rate and composition of future scans while camped on the same cell. This automated learning logic may be contained in the baseband of the UE or other portions of the UE, as desired. This scanning improvement may be performed in the non-MCC HP-PLMN scans and/or may be used in various other types of scans. Thus the framework described herein can be reused to reduce the scan times in various different scenarios, as described further below.

Figure 5:
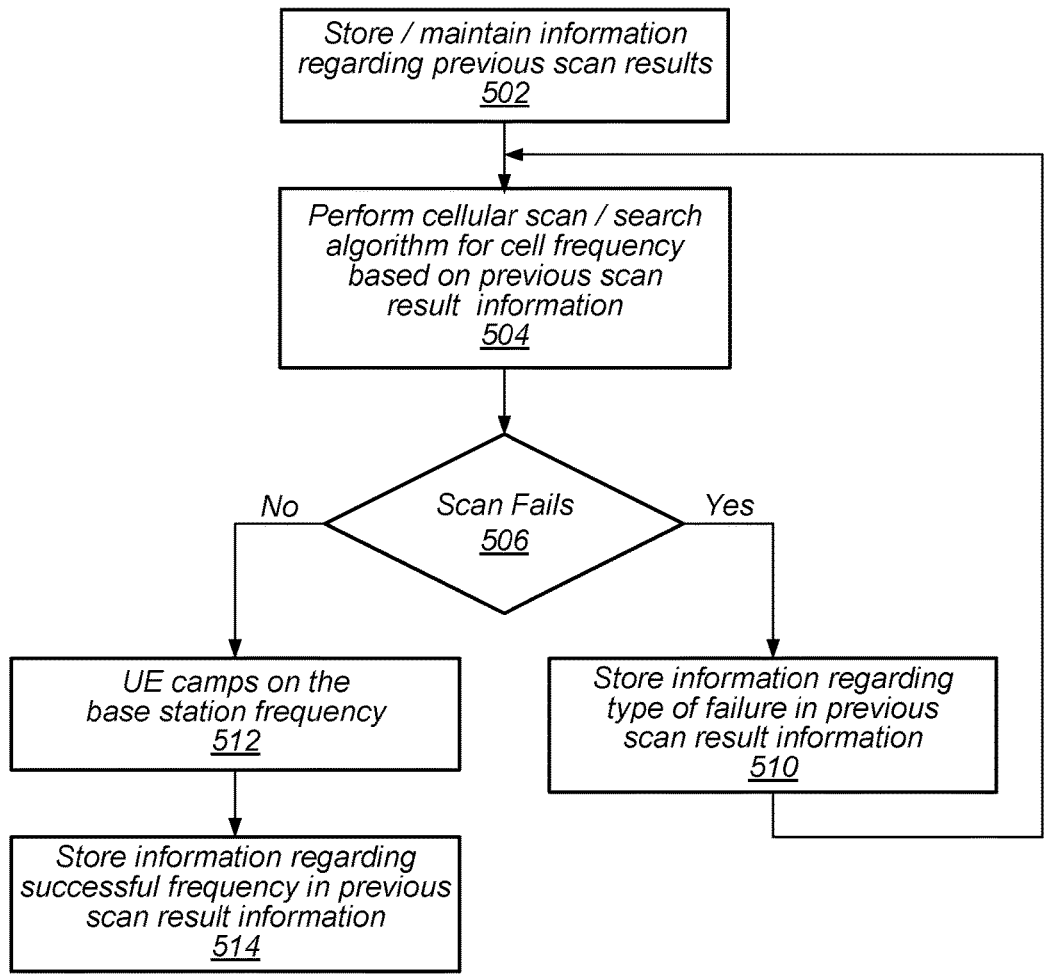
FIG. 5 is a flowchart diagram illustrating an example method by which the UE may more efficiently scan for available base stations, according some embodiments.

FIG. 5—Flowchart Diagram

FIG. 5 is a flowchart diagram illustrating one embodiment of a method performed by a UE for more efficiently performing scanning operations to search for available base stations in a cellular communication system. This method uses historical information to determine the frequency and content of a scan for a new cell in a cellular communication system. This method may be used in various types of cellular communication systems across any of a variety of cellular technologies.

As shown, at 502 the UE stores and/or maintains information regarding results of previous cellular network scans. Thus in some embodiments the UE may maintain a data structure (or database) that stores a number of successful and/or unsuccessful cellular network scans on a per cell basis. In other words, the data structure may store the number of successful and/or unsuccessful cellular network scans while camped on a given cell. The cellular network scan results that are recorded may be either HP-PLMN scans, reselection scans, out-of-service (OOS) scans, or better system reselection (BSR) scans. For successful scans, the UE may keep track of the cellular frequency in which the scan succeeded. Thus in some embodiments the data structure may store successful and/or unsuccessful cellular network scan information on both a per cell basis as well as a per cell frequency basis. In some embodiments, for unsuccessful scans, the UE may keep track of the stage at which the scan failed (e.g., failed at the acquisition stage, failed during system information decode stage, etc.)

Additionally, in some embodiments, the data structure may include information for each type of scan performed while camping on a cell. Thus, the data structure may include one or more data structures. For example, the data structure may include a first data structure that maintains information regarding out-of-service (OOS) scan history. As another example, the data structure may include a second data structure that maintains information regarding high-priority system scan history.

In some embodiments, the data structure may be updated as criteria are met. For example, criteria for updating the data structure may include one or more of an aging criterion, an operator update as new cells are deployed, a SIM card update or change, and an update from an external server that may gather information from one or more other UEs.

FIG. 8 shows one example of a cellular scan result data structure that may be maintained by the UE. As shown, the data structure may have fields for cellular information, scan type, number of successes, last success, number of failures, last failure, and successful RAT/frequency.

The cellular information may comprise the cell global identity (CGI), which is a standard identifier for mobile phone cells.

In some embodiments, the scan type may be a value that specifies either HP-PLMN, BSR or Reselection. For example, the scan type may range between values 1, 2, or 3, where 1=HP-PLMN; 2=BSR; and 3=reselection.

The last success and last failure fields may comprise timestamps of when the last success or last failure occurred, respectively. The successful RAT/frequency column may specify the radio access technology and associated frequency of the successful scan. For example, for Cell C2 the successful RAT may be W-CDMA on Frequency 3, and for Cell C3 the successful RAT may be LTE on Frequency 3.

The cellular scan result data structure may comprise other information, such as a list of frequencies to be scanned for each cell, which may be maintained in the form of a "white list", as discussed further below. Thus the cellular scan result data structure may comprise other information instead of, and/or in addition to, that shown in FIG. 8.

In 504 the UE scans for cellular service, e.g., scans for a new cell in the cellular network on which to camp. At least one of the frequency of the scan operation and the scan operation itself may be based at least in part on the information contained in the previous scan result data structure maintained in 502. More particularly, the UE may examine the contents of the scan history data structure maintained in 502 (and updated as indicated in 510 and 514 below) and use this information to adjust one or more of the frequency of the cellular scan or the cellular scan operation itself. The cellular scan performed in 504 of FIG. 5 is described in greater detail with respect to FIG. 6.

If the cellular scan performed in 504 fails as indicated in 506, e.g., the scan in 504 does not determine a new cell on which to camp, then in 510 the UE stores information regarding the type of failure in the scan result data structure.

If the cellular scan performed in 504 is successful as indicated in 506, e.g., the scan in 504 does determine a new cell on which to camp, then in 512 the UE camps on the new cell determined in 504, e.g., begins using the new base station cellular frequency determined in 504. Also, if the cellular scan performed in 504 is successful as indicated in 506, then in 514 the UE stores information regarding the new cell (or new cellular frequency) in the scan result data structure. Thus in each of 510 and 514 the UE operates to update information in the scan result data structure that is being maintained in 502.

FIG. 6

Figure 6:
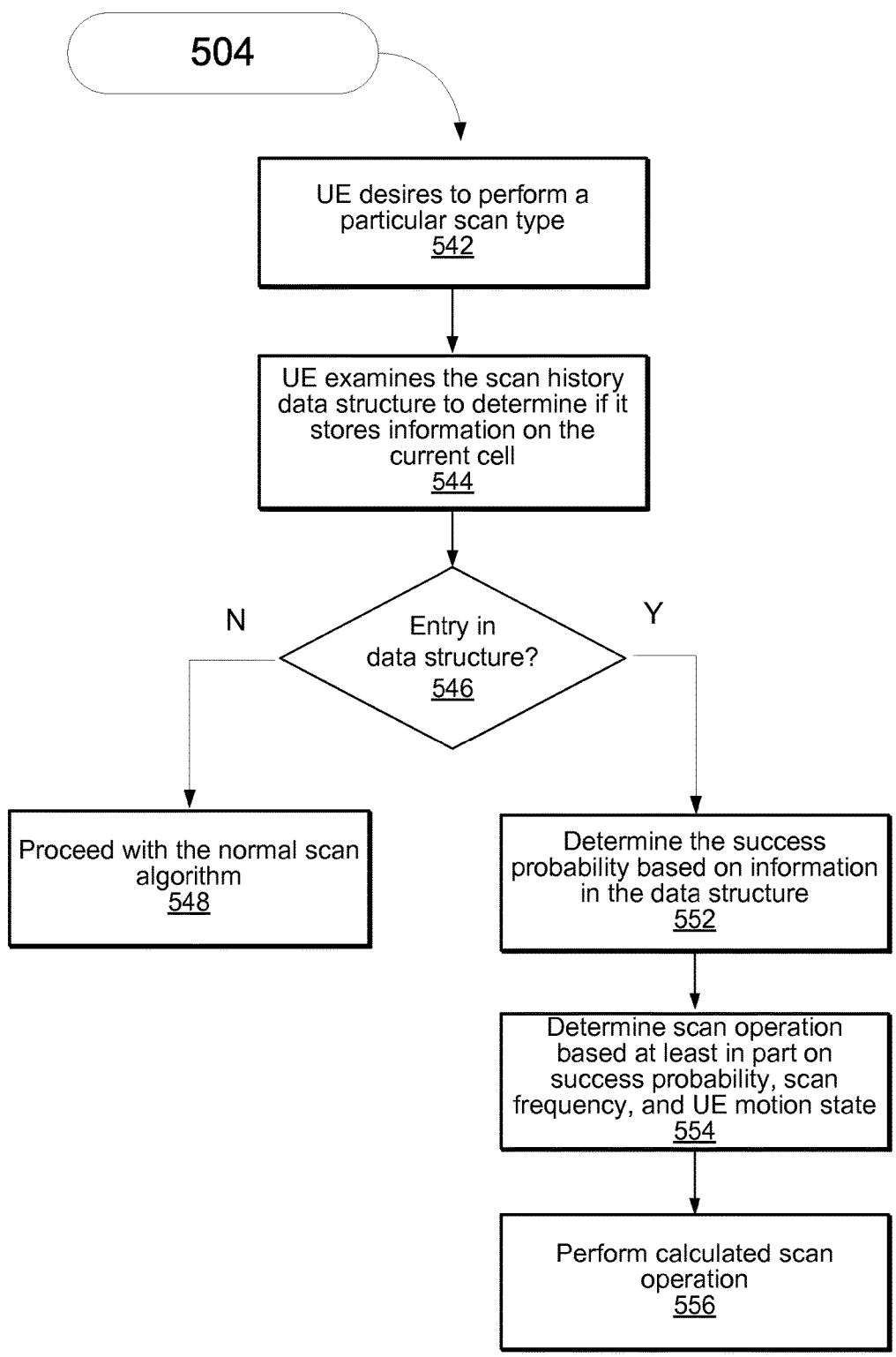
FIG. 6 illustrates an example method for scanning for cellular service according to some embodiments.

FIG. 6 is a flowchart diagram illustrating more detail regarding one example of operation of 504 of FIG. 5.

In 542 the UE desires to perform a particular scan type. For example, in 542 the UE may receive an indication from another component or software program in the UE indicating a need or desire to scan for a new cell. The desire to scan for a new cell may arise in various scenarios. For example, the desire for a new cellular scan may be an HP-PLMN scan, where the UE is currently camped on a visiting PLMN (VPLMN) and desires to scan for a higher priority PLMN (HP-PLMN). As another example, the desire for a new cellular scan may be a service acquisition scan, e.g., when the UE has been out of service (OOS) and attempts to re-acquire cellular service by executing an OOS search algorithm. Additionally, as another example, the desire for a new cellular scan may be a better system reselection (BSR) scan, e.g., when the UE is currently camped on a lower priority system per multimode system selection databases and desires to scan for a higher priority system. As yet another example, the desire for a new cellular scan may be a reselection scan, e.g., when the UE is currently camped on a cell, but decides to perform a scan or search for a better cell on which to connect.

The UE desiring to scan for cellular service in 542 may be at least in part based on the prior scan result information stored/maintained in 502. In other words, the previous scan result information in 502 may be used at least in part to determine a frequency of the scan as indicated in 504 and performed at 506. In at least some embodiments, the frequency of the scan may be based at least in part on the type of scan, e.g., whether the scan type is HP-PLMN, BSR, or reselection. In other words, the UE may maintain a respective scan frequency or scan schedule that is particular or unique to each scan type. For example, the UE may maintain a variable for each scan type, referred to as N_full_scan, that denotes a number of scan cycles since the last regular (full) scan performed by the UE for each respective scan type (HP-PLMN, BSR, or reselection). In addition, the UE may maintain a respective scan frequency or scan schedule that is particular or unique to each scan failure type. For example, the UE may use a first scan frequency (or rate) if the scan failure type was a pilot acquisition failure and the UE may use a second scan frequency (or rate) if the scan failure type was a system information decode failure.

Further, in some embodiments, the UE may decrease a respective scan frequency or scan schedule based on a device power level. For example, the UE may decrease a respective scan frequency (or rate) if the device power level (i.e., battery level or level of a power supply of the UE) falls below a threshold.

In 544, when the UE is about to perform a particular scan type (HP-PLMN/BSR or reselection), the UE examines the scan history data structure to determine if the data structure has information on the current cell on which the UE is camped for a similar scan type.

If there is no entry in the scan history data structure regarding the current cell on which the UE is camped as indicated at 546, then in 548 the UE proceeds with its usual or normal scan algorithm. In this instance, since there is no information on the current cell in the scan history data structure, the UE may not adjust its scan algorithm, but rather may perform a normal cellular scan, e.g., as may have been done in the prior art.

If there is an entry in the scan history data structure regarding the current cell on which the UE is camped as indicated at 546, then in 552 the UE may determine the success probability (P_Succ) based on the number of prior successes and/or failures stored in the data structure. The success probability may be determined as the number of prior successes divided by the total number of both prior successes and prior failures. The success probability may also be determined based on the failure type of the past failures.

In 554 the UE may determine the scan operation to be performed using one or more of P_Succ, N_Full_Scan, and UE motion state. Thus one or more of these values may be used to determine specific cellular frequencies for which to scan. For example, the success probability (P_Succ) may be used whereby a new cellular frequency may be included in the scan only if its corresponding P_Succ value is greater than a certain threshold. As another example, the N_Full_Scan value may be used whereby a scan is performed for a particular cellular frequency only if a number of scan cycles since the last regular (full) scan performed by the UE on that frequency is greater than a certain threshold. In addition to the above, the motion state of the UE may be considered, whereby a less frequent and/or less comprehensive cellular scan may be performed if the UE is in a stationary or low motion state, and a more frequent and/or more comprehensive cellular scan may be performed if the UE is in a high motion state. In other words, the comprehensiveness of a cellular scan may be based on UE mobility information or mobility state. The term "mobility" as used herein may refer to the state of motion of the UE, i.e., the degree of motion the UE is experiencing. The cellular scan performed at 556 may be influenced by other types of information in addition to (or instead of) the items described above.

FIG. 7

Figure 7:
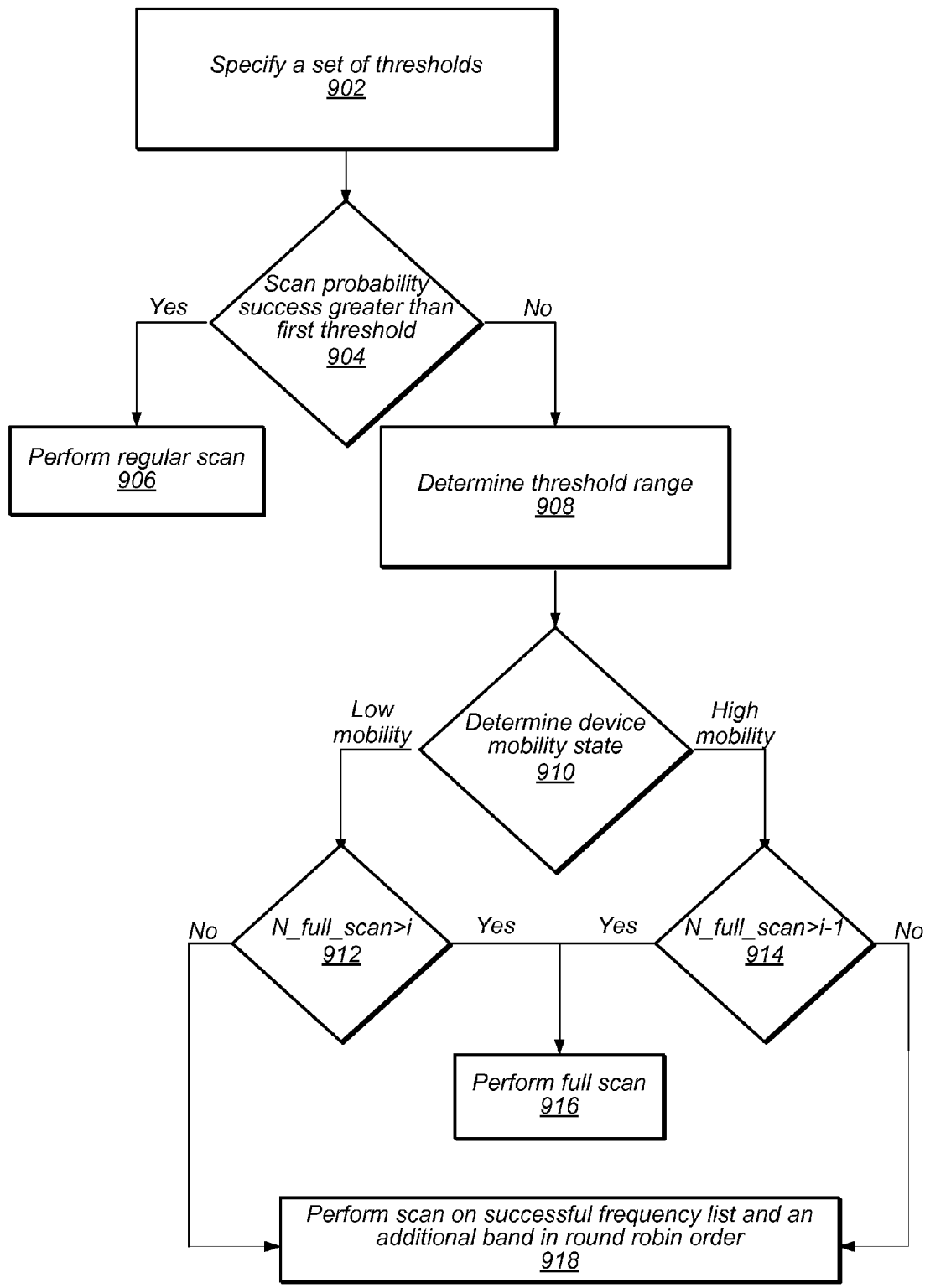
FIG. 7 is a flowchart diagram illustrating a method for determining a cellular scan to be performed, according to some embodiments.

FIG. 7 illustrates an example of an algorithm that may use the above variables in determining the cellular scan to be performed, according to some embodiments. In other words, the following is one example of using P_Succ, N_Full_Scan, and mobility state in determining the nature of the cellular scan to be performed. It is noted that FIG. 7 is merely one example, and many other types of methods may be used to determine the composition and/or frequency of a cellular scan.

At 902, a set of thresholds may be specified. The thresholds may be compared to P_Succ and the index of the threshold may be compared to N_Full_Scan. For example, for i=1, a first threshold may be specified (Thresh[1]). Similarly, thresholds may be established for i=2 to n with the threshold for each increment of i decreasing. An example of a set of thresholds is shown in Table 1 below.

TABLE 1

| P_Succ Thresholds | |
|---|---|
| i | Thresh[i] |
| 1 | 0.90 |
| 2 | 0.70 |
| 3 | 0.35 |
| 4 | 0.10 |
| 5 | 0.00 |

At 904, P_Succ may be compared to the first threshold, Thresh[1]. If P_Succ is greater than Thresh[1], then the algorithm may continue to 906. At 906, a regular scan may be performed. Alternatively, if P_Succ is less than Thresh[1], the algorithm may continue at 908. At 908, a threshold range for P_Succ may be determined. In other words, in an iterative manner, P_Succ may be compared to each threshold in the set of thresholds to determine between which thresholds P_Succ falls such that P_Succ satisfies the condition that Thresh[i+1]<P_Succ<=Thresh[i].

Continuing to 910, once i is known, the mobility state of the UE may be determined. If the UE has low mobility (i.e., is slower moving or stationary), the algorithm may be continued at 912. Alternatively, if the UE has high mobility (i.e., is faster moving), the algorithm may be continued at 914.

At 912, once it is determined that the UE has low mobility, N_Full_Scan may be compared to i. If N_Full_Scan is greater than i, then a full scan may be performed at 916. Alternatively, in N_Full_Scan is less than i, a scan may be performed on frequencies in a successful frequency list at 918. Additionally, one other band not in the successful frequency list may also be scanned in a round robin fashion.

At 914, once it is determined that the UE has high mobility, N_Full_Scan may be compared to i−1 or alternatively, to another integer less than i−1 and greater than 0. If N_Full_Scan is greater than i−1, then a full scan may be performed at 916. Alternatively, in N_Full_Scan is less than i−1, a scan may be performed on frequencies in a successful frequency list at 918. Additionally, one other band not in the successful frequency list may also be scanned in a round robin fashion.

Various other methodologies may be used to utilize the above information in determining or adjusting the manner of cellular scan to be performed.

The method described in FIGS. 5, 6, and 9 may be used to reduce or eliminate some or all of the drawbacks described above with respect to HP-PLMN scans. Thus in some embodiments the method may use the success and/or failure of past non-MCC HP-PLMN scans on a given cell to determine the rate and composition of future scans while camped on the same cell. Note that in some embodiments, the methods described above may also be used to reduce scan times during other scenarios as described in more detail below.

In some embodiments, the UE may build and maintain scan history information by maintaining one or more lists regarding HP-PLMN. A first list may include cells for which a cellular scan has been successful (e.g., a HP-PLMN whitelist) and a second list of cells for which a cellular scan has not been successful (e.g., a HP-PLMN blacklist). Thus, a cell may be added to the first list or moved to the top of the first list if it was already present on the first list when a non-MCC HP-PLMN scan succeeds when the UE is camped on the cell. For example, if a non-MCC HP-PLMN scan succeeds when the UE is camped on a cell with cell-ID=C1, PLMNID=P1, the UE may first determine whether the cell (P1/C1) is present on the first or second list. If P1/C1 is present on the second list, it may be removed from the second list and added to the top of the first list. If P1/C1 is present on the first list, it may be moved to the top of the first list. If P1/C1 is not on either list, it may be added to the top of the first list.

As another example, if a non-MCC HP-PLMN scan fails when camped on cell P1/C1, the UE may first determined whether the cell (P1/C1) is present on the first or second list. If P1/C1 is present on the first list, then no action may be taken. However, if P1/C1 is not present on the first list, then it may be added to or moved to the top of the second list and a failure count variable associated with the cell may be incremented.

Note that the lists may be limited to a specified number of entries in some embodiments. Thus, if a new cell is to be added to one of the lists and adding the new cell would exceed the specified number of entries, the bottom-most entry may be removed when the new one is added to the top.

In addition to building and maintaining the lists, the UE may use the lists in determining when and how to perform HP-PLMN scans. For example, if the UE is camped on a cell X/Y and the UE needs to perform a non-MCC HP-PLMN scan, the UE may check the lists to determine if cell X/Y is present on either list. If cell X/Y is present on the second list (e.g., the blacklist) for example, the UE may check the failure count for the cell and compare the failure count to a failure threshold (N_min_bl). If the failure count for cell X/Y exceeds the threshold, the UE may perform the HP-PLMN 1 out of a specified number of scans (e.g., if the specified number of scans is 4, then the UE may perform the HP-PLMN 1 out of every 4 scans meaning the scan would only occur once every 24 minutes while on cell X/Y). In other words, while camped on a cell present on the second list, the UE may limit HP-PLMN scans to conserve power if the failure count exceeds the failure threshold.

In some embodiments, the failure threshold may be a function of the mobility state of the UE. For example, if the UE is in a lower mobility state (e.g., no motion or the user is walking) and a step count is less than a specified step count, then the specified failure threshold may be used. However, if the UE is in a lower mobility state and the step count is greater than the specified step count, then the specified failure threshold may be reduced, for example, by a factor of two. Further, if the UE is in a higher mobility state (e.g., the user is running or in a moving vehicle), the specified failure threshold may be set to a lower value such as 1.

As mentioned above, limiting HP-PLMN scans may conserve power at the UE in some embodiments. Additionally, in some embodiments, the above described techniques may also be used for domestic HP-PLMN. For example, if a current camped cell is in a list of combined domestic and non-MCC cells for which a cellular scan has not been successful (e.g., a "combined domestic+non-MCC blacklist") the UE may restrict the scans to a smaller set of channels during every N_bl HP-PLMN scan (where N_bl is a configurable parameter associated with the blacklist). The smaller list of channels may include a list of channels in an acquisition database (ACQ_DB) and channels with highest SNR in last band scan. The channels with highest SNR in last band scan may be limited in quantity to 10 channels. In some embodiments, the quantity may be limited to other values, such as 20 or 5, among other values. Note that in some embodiments, the mobility state of the UE may be used to enable/disable the restriction to the smaller set of channels.

In some embodiments, more information such as a band/RAT in which HP-PLMN scan succeeded previously may be added to combined list ("combined whitelist") that may also include the first list of cells for which a cellular scan has been successful. Thus, if a current cell is in the "combined whitelist", the UE may restrict every N_wl HP-PLMN scan to the bands in which scans previously succeeded (where N_wl is a configurable parameter associated with the whitelist). Note that in some embodiments, the mobility state of the UE may be used to enable/disable the use of a combined whitelist.

In addition to the above described embodiments, the techniques described herein may also be used to improve BSR scans and improve femtocell/CSG scans.

Some example embodiments relate to optimizing out-of-service (OOS) scans, which a UE may use to acquire service with a network. For example, if the UE goes out-of-service (OOS), it may attempt to reacquire service by executing an OOS search algorithm. In the OOS search algorithm a balance is typically desired between power usage and acquisition performance. In order to conserve power states while executing the OOS search algorithm, the UE may alternate between operating in a scanning state, which may expend power but allow for service acquisition, and operating in a sleeping state, which may conserve power but delay service acquisition. In a current OOS search algorithm, the scan times are split into scans for most recently used frequencies (SLS scans) and full band scans on bands likely to be found in the last camped area (DBS scans). After a certain period of time, one in every x DBS scans may include all supported bands. The frequency (SLS) scans are typically of significantly shorter duration than the band (DBS) scans and hence are performed at a faster rate. Typically, the duration of the sleep cycles of the UE gradually increases as OOS duration (i.e., the period of time in which the UE has lacked service) increases.

The SLS and/or DBS scans may take significantly longer periods of time in certain scenarios or under certain undesirable channel conditions. These longer scan durations may significantly increase power consumption of the UE. Thus, it may be desirable to optimize DBS and SLS scans in order to decrease the duration of scans and/or to decrease the occurrences of scans with extended durations. In other words, it may be desirable to decrease power consumption by adjusting scan/sleep duty cycle and selecting the best frequencies/systems to scan based on past history without affecting performance.

Various scenarios may result in undesirably long scanning durations for SLS or DBS scans. For example, extended SLS scan durations may result from one or more of the following scenarios: the pilot is acquired but the camping criterion (S_criterion) check fails; the camping criterion is met on a frequency but the UE fails to decode other system information messages; the UE is able to decode the system information messages but finds a forbidden PLMN; or the UE is able to decode a system information messages but random access channel (RACH) attempt fails when it attempts to register. Similarly, undesirably long or extended DBS scan durations may result from one or more of the following scenarios: the coarse frequency scan over band reveals several potentially good candidates, but a pilot is not acquired during the fine frequency scan; or the coarse frequency scan reveals energy, but the UE fails the camping criterion on the frequency.

The conditions or problems leading to longer SLS or DBS scan durations may persist for some time or over multiple scans. Thus, in some scenarios the same issue (or issues) may encumber SLS or DBS over multiple scan cycles. This inefficiency may be addressed by adapting scans according to information learned in prior SLS or DBS scans. The UE may use information regarding problematic channels or bands to optimize subsequent scans. For example, the UE may capture information concerning frequencies that exhibited undesirable behavior over prior scan periods (e.g., over the past n scan periods) of a current OOS timeline. The UE may also capture the types of failures and the duration since each failure. The UE may maintain a data structure comprising this data, e.g., an OOS fail table as illustrated in FIG. 9. For example, a row of data in the OOS fail table may comprise information regarding the frequency with which a failure was experienced (e.g., an absolute radio-frequency channel number (ARFCN)), the type of failure, and an indication of the time that the failure occurred, e.g., the failure occurrence time. In some embodiments, a row of data in the OOS fail table may comprise information regarding a stage at which scan failure occurred (e.g., pilot acquisition failure, camping criterion failure, RACH failure, system information decode failure, etc.).

The UE may use a list of rules as illustrated in FIG. 10 to handle problematic frequencies according to information regarding prior scans of those frequencies as stored in the OOS fail table. Different failure types may be associated with corresponding protocols, which may dictate the handling of problematic frequencies in subsequent SLS or DBS scans. The handling of problematic frequencies may be influenced by various factors, such as the type of failure, the time of occurrence of the failure, the state of motion (mobility state) of the UE (e.g., whether the UE is determined to be slower moving or stationary versus faster moving or in motion), or whether SLS or DBS scans are being used. Example protocols for various failure types are further described below in Reference to FIG. 10.

The failure occurrence time may provide a timestamp of the failure so that the duration since the failure can be determined. The time having passed since the occurrence of the failure may influence the handling of the failure. If the failure occurred at a time beyond a certain threshold value, the failure may be considered obsolete and thus may be disregarded. The UE may use different time thresholds for different types of failures. The motion of the UE may also influence time threshold value for a given failure. If the UE is in a low mobility state the time threshold may be a higher value so that the failure is taken into consideration for a longer period of time. Conversely if the UE is in a high mobility state the time threshold may be a lower value and the failure may be taken into consideration for a shorter duration.

As shown in FIG. 10, a first failure type may be associated with a camping criterion failure (S_criterion fail). In such instances, to handle the problematic frequency in SLS, the UE may base omission of the problematic frequency on the state of motion (mobility state) of the UE. For example, if the UE has lower mobility (e.g., is slower moving or stationary), the UE may omit the associated problematic frequency from two of three SLS scans. Alternatively, if the UE has higher mobility (e.g., is faster moving or in motion), the UE may omit one out of three SLS scans. Additionally, the handling of the problematic frequency in DBS may be based at least in part on the SLS scans. For example, the problematic frequency may be blocked from DBS scans if it is part of an SLS list of omitted frequencies.

Also shown in FIG. 10, a second failure type may be associated with a past failure to decode the SIB for the problematic frequency. Similar to the first failure type, to handle the problematic frequency in SLS, the UE may base omission of the problematic frequency on the state of motion (mobility state) of the UE. For example, if the UE has lower mobility (e.g., is slower moving or stationary), the UE may omit the associated problematic frequency from one of three SLS scans. Alternatively, if the UE has higher mobility (e.g., is faster moving or in motion), the UE may avoid SIB decoding in one out of three SLS scans. In at least some instances, avoiding the SIB decoding may be based on whether a received signal strength indicator (RSSI) is less than or equal to a failure RSSI. Additionally, the handling of the problematic frequency in DBS may be based at least in part on the SLS scans. For example, the problematic frequency may be blocked from DBS scans if it is part of an SLS list of omitted frequencies.

Additionally, as shown in FIG. 10, a third failure type may be associated with a forbidden PLMN encountered for the problematic frequency. In such instances, to handle the problematic frequency in SLS, the UE may avoid the frequency for a designated number of SLS scans (e.g., N_forbid scans) if the UE has a lower mobility state. However, if the UE has a higher mobility state, the UE may continue to scan for the problematic frequency. Similarly, to handle the problematic frequency in DBS, the UE may avoid the frequency for a designated number of DBS scans (e.g., N_forbid_DBS scans) if the UE has a lower mobility state. However, if the UE has a higher mobility state it may continue to scan for the problematic frequency.

A fourth failure type, as shown in FIG. 10, may be associated with a RACH failure encountered for the problematic frequency. In such instances, avoidance logic from RACH optimization, as known in the art, may be sufficient to handle the problematic frequency in SLS scans.

A fifth failure type, as shown in FIG. 10, may be associated with a spurious fine frequency energy for the problematic frequency. In this instance, the UE may detect an energy spike at a certain frequency and erroneously conclude that this is a signal from a base station, when in fact it is merely a spurious signal or noise. In such instances, the UE may use a higher fine frequency threshold for DBS scans of the problematic frequency. However, if the UE is determined to have a higher mobility state, it may not use a higher fine frequency threshold.

In some embodiments the UE may vary its sleep time, i.e., the duration of time it exists in a sleep state. For example, the UE may target a constant duty cycle, i.e., may attempt to maintain a certain ratio between sleep time and scan time. Thus, the UE may vary sleep duration according to the scan duration being experienced. In scenarios wherein SLS or DBS scans take longer due to poor channel conditions, sleep time may be increased to compensate for the higher power demands of the extended scanning cycles. However, extending sleep time may also negatively affect reacquisition time, as the UE may limit opportunities for acquiring service by spending more time in a sleep state. Thus, in some embodiments such an algorithm for varying sleep time may be selectively applied only under certain conditions, e.g., when the UE is in a power-saving mode due to low power level of a power supply of the UE (e.g., a low power level of a battery).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
at least one antenna for performing wireless communications;
a radio coupled to the at least one antenna;
a memory; and
a processing element coupled to the memory and radio;
wherein the processing element is configured to:
store, in the memory, information regarding results of prior cellular scan operations for a first cell, wherein the prior cellular scan operations were performed by the UE to identify frequencies of available cellular base stations, wherein the prior cellular scan operations comprise one or more of higher priority public land mobile network (HP-PLMN) scans, reselection scans, out-of-service (OOS) scans, and better system reselection (BSR) scans, wherein, for a successful scan performed by the UE, the information regarding results of prior cellular scan operations comprises a cellular frequency in which the successful scan succeeded, wherein, for an unsuccessful scan performed by the UE, the information regarding results of prior cellular scan operations comprises a stage at which the unsuccessful scan failed; and
perform, via the radio, a new cellular scan operation while camped in the first cell, wherein at least one of a frequency of the new scan operation and a type of the new cellular scan operation is based at least in part on the information regarding results of prior cellular scan operations.

2. The UE of claim 1,
wherein the information regarding results of prior cellular scan operations further comprises, for each of a plurality of cells, a first number of successful cellular scans and a second number of unsuccessful cellular scans.

3. The UE of claim 1,
wherein the processing element is further configured to update the information regarding results of prior cellular scan operations with information regarding success or failure of the new cellular scan operation.

4. The UE of claim 1,
wherein the processing element is further configured to update the information regarding results of prior cellular scan operations based at least in part on one or more criteria, wherein the one or more criteria comprise at least one of an aging criterion, an operator update as new cells are deployed, a subscriber identity module (SIM) card update, a SIM card change, and an update from an external server that collects information from one or more other UEs.

5. The UE of claim 1,
wherein a scan time of the new cellular scan operation is based on a sleep time of the UE, wherein the processing element is further configured to increase the sleep time of the UE as the scan time of the new cellular scan operation increases.

6. The UE of claim 1,
wherein the information regarding results of prior cellular scan operations is stored in a data structure;
wherein the data structure comprises information regarding results of prior cellular scan operations for each of a plurality of cells.

7. The UE of claim 1,
wherein the information regarding results of prior cellular scan operations is stored in a plurality of data structures, wherein each data structure of the plurality of data structures is associated with the type of cellular scan operation;
wherein the type of cellular scan operation includes at least one of a HP-PLMN scan, a reselection scan, an OOS scan, and a BSR scan.

8. The UE of claim 1,
wherein the processing element is configured to perform the new cellular scan operation at a rate that is based at least in part on the information regarding results of prior cellular scan operations.

9. The UE of claim 1,
wherein the stage at which the unsuccessful scan failed is associated with a scan failure type, wherein the scan failure type comprises at least one of a pilot acquisition failure and a system information decode failure.

10. The UE of claim 1,
wherein the processing element is configured to perform the new cellular scan operation at a rate that is based at least in part on at least one of the scan failure type or a power level of the UE.

11. The UE of claim 1,
wherein the new cellular scan operation is based at least in part on the information regarding results of prior cellular scan operations and a motion state of the UE.

12. The UE of claim 1,
wherein the processing element is configured to adjust the new cellular scan operation based at least in part on a number of cellular scan cycles since a last regular cellular scan performed by the UE for a respective scan type.

13. The UE of claim 1,
wherein the new cellular scan operation scans for a set of cellular frequencies;
wherein the processing element is configured to select cellular frequencies for inclusion in the set of cellular frequencies to be scanned based at least in part on a probability of success of each of the cellular frequencies;
wherein, for each respective cellular frequency, the probability of success of the respective cellular frequency is based on information regarding past successes and failures of scans of the respective cellular frequency.

14. The UE of claim 1,
wherein the processing element is further configured to maintain a first list of cells for which a cellular scan has been successful and a second list of cells for which a cellular scan has not been successful;
wherein the processing element is configured to adjust the new cellular scan operation based at least in part on contents of at least one of the first list or the second list.

15. The UE of claim 1,
wherein performance of a full scan is based on a time since last full scan occurred and/or a mobility state of the UE.

16. A non-transitory computer accessible memory medium comprising program instructions which, when executed at a wireless user equipment (UE) device, cause the UE to:
receive an indication that a cellular scan is to be performed while the UE is camped in a first cell;
access first information regarding results of prior cellular scan operations for the first cell
analyzing a data structure to determine that the data structure comprises first information regarding results of prior cellular scan operations for the first cell, wherein the prior cellular scan operations comprise one or more of higher priority public land mobile network (HP-PLMN) scans, reselection scans, out-of-service (OOS) scans, and better system reselection (BSR) scans, wherein, for a successful scan performed by the UE, the information regarding results of prior cellular scan operations comprises a cellular frequency in which the successful scan succeeded, wherein, for an unsuccessful scan performed by the UE, the information regarding results of prior cellular scan operations comprises a stage at which the unsuccessful scan failed;
determine a set of cellular frequencies and a type of cellular scan for the cellular scan based at least in part on the first information; and
perform the cellular scan using the determined set of cellular frequencies and the type of cellular scan.

17. The memory medium of claim 16, wherein the program instructions are further executable to cause the UE to:
determine a success probability based on the first information, wherein the first information comprises a number of prior successes and a number of prior failures.

18. The memory medium of claim 16,
wherein the first information regarding results of prior cellular scan operations is stored in a data structure;
wherein the data structure comprises information regarding results of prior cellular scan operations for each of a plurality of cells; and
wherein to access first information, the program instructions are further executable to cause the UE to:
access the data structure.

19. The memory medium of claim 16, wherein the program instructions are further executable to cause the UE to:
maintain a first list of cells for which a cellular scan has been successful and a second list of cells for which a cellular scan has not been successful; and
adjust the cellular scan operation based at least in part on contents of at least one of the first list or the second list.

20. The memory medium of claim 16, wherein the program instructions are further executable to cause the UE to:
update the first information regarding results of prior cellular scan operations with information regarding success or failure of the cellular scan operation.

21. A method for operating a wireless user equipment (UE) device, the method comprising:
by the UE:
receiving an indication that a cellular scan is to be performed while the UE is camped in a first cell;
analyzing a data structure to determine that the data structure comprises first information regarding results of prior cellular scan operations for the first cell, wherein the prior cellular scan operations comprise one or more of higher priority public land mobile network (HP-PLMN) scans, reselection scans, out-of-service (OOS) scans, and better system reselection (BSR) scans, wherein, for a successful scan performed by the UE, the information regarding results of prior cellular scan operations comprises a cellular frequency in which the successful scan succeeded, wherein, for an unsuccessful scan performed by the UE, the information regarding results of prior cellular scan operations comprises a stage at which the unsuccessful scan failed; and performing a new cellular scan operation while camped in the first cell, wherein at least one of a frequency of the new scan operation and a type of the new cellular scan operation is based at least in part on the first information regarding results of prior cellular scan operations for the first cell.

22. The method of claim 21,
wherein the first information regarding results of prior cellular scan operations further comprises a first number of successful cellular scans and a second number of unsuccessful cellular scans.

23. The method of claim 21, further comprising:
by the UE:
updating the first information regarding results of prior cellular scan operations with information regarding success or failure of the new cellular scan operation.

24. The method of claim 21, further comprising:
by the UE:
adjusting the new cellular scan operation based at least in part on a number of cellular scan cycles since a last regular cellular scan performed for a respective scan type.

25. The method of claim 21, further comprising:
by the UE:
maintaining a first list of cells for which a cellular scan has been successful and a second list of cells for which a cellular scan has not been successful; and
adjusting the cellular scan operation based at least in part on contents of at least one of the first list or the second list.

* * * * *